United States Patent
Sivasankaran et al.

(10) Patent No.: US 12,443,369 B2
(45) Date of Patent: Oct. 14, 2025

(54) AUTOMATED FAST PATH PROCESSING

(71) Applicant: Sandisk Technologies, Inc., Milpitas, CA (US)

(72) Inventors: Vijay Sivasankaran, Dublin, CA (US); Dinesh Agarwal, Bangalore (IN); Mikhail Palityka, Oakville (CA)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 17/951,993

(22) Filed: Sep. 23, 2022

(65) Prior Publication Data

US 2024/0103762 A1 Mar. 28, 2024

(51) Int. Cl.
- G06F 3/00 (2006.01)
- G06F 3/06 (2006.01)
- G06F 12/00 (2006.01)

(52) U.S. Cl.
CPC .......... *G06F 3/0659* (2013.01); *G06F 3/0607* (2013.01); *G06F 3/0679* (2013.01)

(58) Field of Classification Search
CPC ..... G06F 3/0659; G06F 3/0607; G06F 3/0679
USPC ........................................................ 711/154
See application file for complete search history.

(56) References Cited

U.S. PATENT DOCUMENTS

| | | | | |
|---|---|---|---|---|
| 6,128,026 A * | 10/2000 | Brothers, III | ........ | G09G 5/399 345/503 |
| 6,799,283 B1 * | 9/2004 | Tamai | ........ | G06F 11/1088 |
| 7,546,421 B2 * | 6/2009 | Tsien | ........ | G06F 12/0833 711/146 |
| 8,990,509 B2 * | 3/2015 | Pan | ........ | G06F 3/0658 711/138 |
| 9,021,178 B2 * | 4/2015 | Guda | ........ | G06F 3/0659 711/158 |
| 9,798,493 B2 * | 10/2017 | Authement | ........ | G06F 3/0688 |

(Continued)

OTHER PUBLICATIONS

Stratikopoulos, A., Kotselidis, C-E., Goodacre, J., & Lujan, M. (2018). "FastPath: Towards Wire-speed NVMe SSDs." 2018 28th International Conference on Field Programmable Logic and Applications (FPL) (2018 28th International Conference on Field Programmable Logic and Applications (FPL)). IEEE. https://doi.org/10.1109/FPL.2018.00036.

*Primary Examiner* — Sheng Jen Tsai

(74) *Attorney, Agent, or Firm* — Rutan & Tucker LLP; Hani Z. Sayed; Ravi Mohan

(57) ABSTRACT

Processing commands received from a host computing device by a storage device can require a large amount of processing overhead. This demand for ever greater processing power increases as the size of storage devices increase. Traditional methods have added an increasing number of processors or CPUs to handle these requirements. However, by utilizing a fast path accelerated processing pipeline, additional processors may not be necessary. An accelerated processing pipeline can be configured to bypass one or more steps that are required by non-priority processing pipelines. Each received command can be parsed to determine if it is suitable for accelerated processing. The command can be required to access data in a limited region of the memory device, or to have any data necessary to process the command already in a cache memory. Upon completion of verifications, commands can be placed in a priority queue that is processed before a non-priority queue.

20 Claims, 8 Drawing Sheets

(56) References Cited

U.S. PATENT DOCUMENTS

| | | | | |
|---|---|---|---|---|
| 9,804,783 | B1* | 10/2017 | Bao | G06F 3/0659 |
| 10,025,522 | B2* | 7/2018 | Helmick | G06F 3/0659 |
| 10,466,904 | B2* | 11/2019 | Benisty | G06F 13/1642 |
| 11,561,912 | B2* | 1/2023 | Shin | G06F 3/0671 |
| 11,635,898 | B2* | 4/2023 | Richter | G06F 3/0613 |
| | | | | 711/103 |
| 11,709,635 | B2* | 7/2023 | Benisty | G06F 3/0679 |
| | | | | 711/133 |
| 12,229,452 | B2* | 2/2025 | Li | G06F 3/0679 |
| 2002/0164019 | A1* | 11/2002 | Fairclough | G06F 7/723 |
| | | | | 713/189 |
| 2003/0088591 | A1* | 5/2003 | Fish | G06F 16/9574 |
| 2006/0173995 | A1* | 8/2006 | Moriwaki | G01D 21/00 |
| | | | | 709/224 |
| 2010/0045683 | A1* | 2/2010 | Kim | G06T 15/005 |
| | | | | 345/506 |
| 2013/0159609 | A1* | 6/2013 | Haas | G06F 12/0246 |
| | | | | 711/103 |
| 2015/0244670 | A1* | 8/2015 | Dong | H04L 61/4511 |
| | | | | 709/245 |
| 2016/0019151 | A1* | 1/2016 | Venkatasubramanian | |
| | | | | G06F 9/3873 |
| | | | | 711/122 |
| 2017/0075572 | A1* | 3/2017 | Utevsky | G06F 3/0688 |
| 2017/0255563 | A1* | 9/2017 | Kamruzzaman | G06F 12/126 |
| 2017/0277366 | A1* | 9/2017 | Narayanan | H04L 41/0266 |
| 2017/0285940 | A1* | 10/2017 | Benisty | G06F 12/0871 |
| 2017/0300263 | A1* | 10/2017 | Helmick | G06F 3/0679 |
| 2018/0300268 | A1* | 10/2018 | Yang | G06F 12/0868 |
| 2018/0321844 | A1* | 11/2018 | Benisty | G06F 13/1642 |
| 2019/0018805 | A1* | 1/2019 | Benisty | G06F 13/1642 |
| 2019/0065072 | A1* | 2/2019 | Dirik | G06F 3/0895 |
| 2019/0065384 | A1* | 2/2019 | Al Sheikh | G06F 12/0859 |
| 2020/0026472 | A1* | 1/2020 | Song | G06F 13/1605 |
| 2020/0310682 | A1* | 10/2020 | Benisty | G06F 13/1642 |
| 2021/0026713 | A1* | 1/2021 | Puttaswamy | G06F 9/546 |
| 2021/0287750 | A1* | 9/2021 | Wu | G06F 9/5016 |
| 2021/0303340 | A1* | 9/2021 | Li | G06F 3/0679 |
| 2021/0349722 | A1* | 11/2021 | Karve | G06F 12/0862 |
| 2022/0058146 | A1* | 2/2022 | Balakrishnan | G06F 3/067 |
| 2022/0083266 | A1* | 3/2022 | Prakash | G06F 3/0679 |
| 2022/0084617 | A1* | 3/2022 | Prakash | G11C 29/42 |
| 2022/0129193 | A1* | 4/2022 | Hill | G06F 3/067 |
| 2022/0147247 | A1* | 5/2022 | Ammari | G06F 13/18 |
| 2022/0147392 | A1* | 5/2022 | Choi | G06F 13/102 |
| 2022/0404979 | A1* | 12/2022 | Wu | G06F 3/0659 |
| 2022/0413719 | A1* | 12/2022 | Wu | G06F 3/0625 |
| 2023/0221889 | A1* | 7/2023 | Benisty | G06F 3/0604 |
| | | | | 711/154 |
| 2023/0342290 | A1* | 10/2023 | Tumanova | G06F 3/061 |
| 2023/0403030 | A1* | 12/2023 | Nayak | G06F 3/0631 |
| 2024/0036736 | A1* | 2/2024 | Anderson | G06F 3/0673 |

* cited by examiner

AUTOMATED FAST PATH PROCESSING

FIELD

The present disclosure relates to storage devices. More particularly, the present disclosure relates to utilizing persistent memory regions within storage devices across multiple protocols and/or multiple hosts.

BACKGROUND

Storage devices are ubiquitous within computing systems. Recently, solid-state storage devices have become increasingly common. These nonvolatile storage devices can communicate and utilize various protocols including non-volatile memory express (NVMe), and peripheral component interconnect express (PCIe) to reduce processing overhead and increase efficiency.

As the sizes of these storage devices grow, it is obvious that the amount of data that needs to be read or written increases. Data that is written to a storage device from a host computing device is often not written in the same order as it is sent to the storage device. This is often due to processes that storage devices utilize to increase overall lifespans by reducing overuse on certain memory devices and reducing wear. As a result, translations and other processing often occurs when a read or write command is received by the storage device.

These translations and other operations required to perform read and write commands can add processing leads and latency to storage device operations. To combat these increasing demands, traditional methods have utilized increased CPU power. Over time, as drives have increased in size and speed demands increased, additional CPUs were added to handle these processes. However, adding additional CPUs and other processors to storage devices has a limit due to costs, space, and power consumption limitations.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
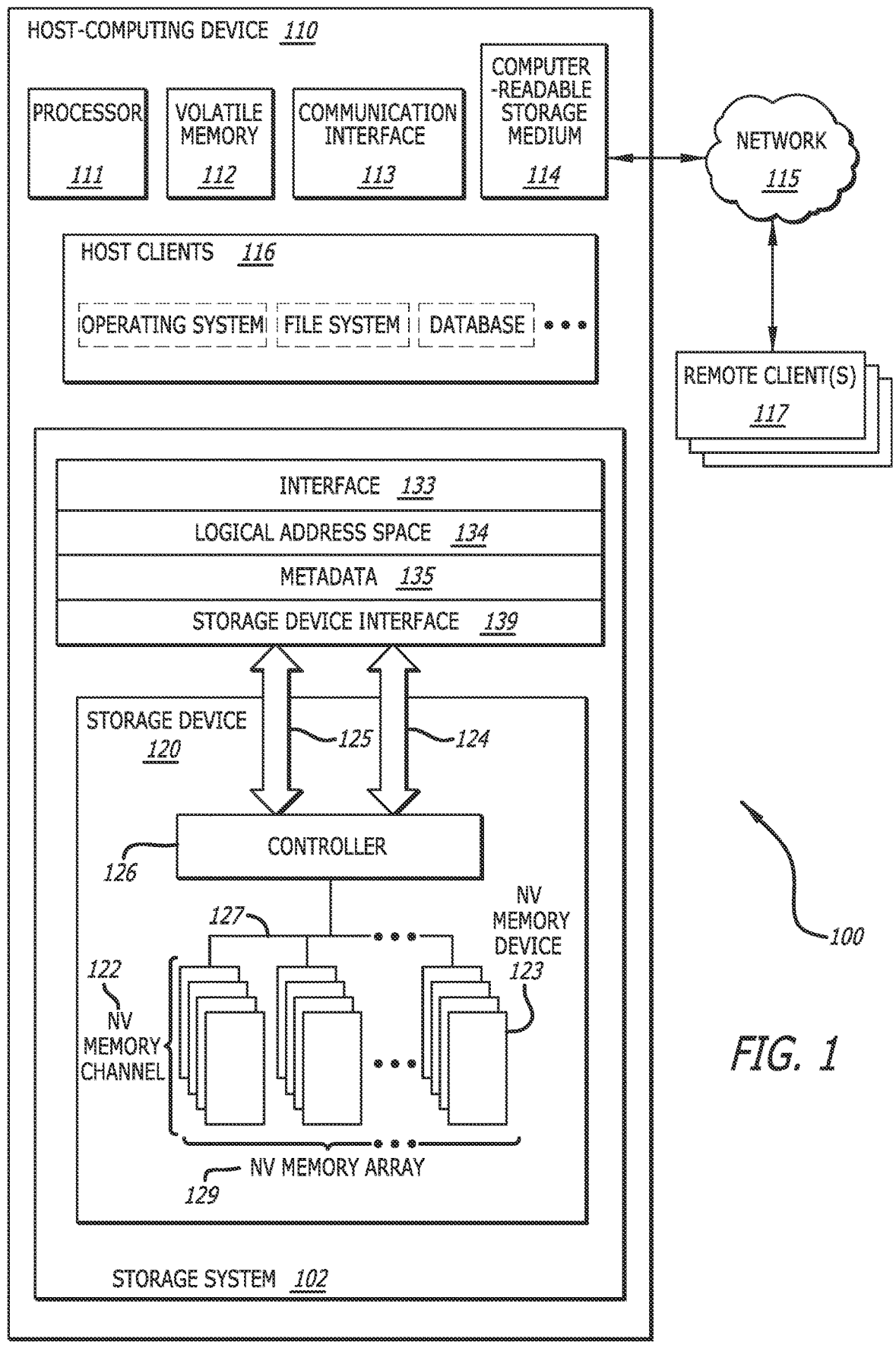
FIG. 1 is a schematic block diagram of a host computing device with a storage device suitable for automated fast path processing in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that operate one or more fast path accelerated processing pipeline within the storage device and/or between the storage device and the host computing device. In a number of embodiments, the accelerated processing pipeline may be configured to utilize a plurality of specialized or otherwise set-aside memories within an existing non-priority pipeline. Special directions or processes could be done to bypass a number of unnecessary or redundant steps that occur in a non-priority processing pipeline. In more embodiments, a priority queue can be configured with access to the memory array which can be processed prior to commands within a non-priority queue.

However, in many embodiments, every command received from the host computing device for the storage device will be better served by utilizing the accelerated processing pipeline. For example, commands, such as random read commands, can greatly increase performance if processed through an accelerated processing pipeline, while other commands may not see much benefit. Thus, in various embodiments, received commands can be parsed to determine which ones may be conducive for accelerated processing.

In further embodiments, further checks and/or validations can be performed to determine if the command is suitable for accelerated processing. For example, if a command requires blocks of memory within the memory array to be accessed that are currently in use by another process, the ability to accelerate the processing can be lost and the command can then be relegated to a regular non-priority processing pipeline. Similarly, if a command requires accessing too many areas of the memory array at once, the time needed to access the data may create a bottleneck or chokepoint within the accelerated pipeline, necessitating the command to be passed to a non-priority processing pipeline. In some embodiments, commands suitable for priority processing may require all data to be access within the memory array to be located within the same memory structure, such as, but not limited to, a hardware die.

In additional embodiments, data associated with the command may need to be available in one or more cache memories. For example, if a logical to physical address table or other data associated with a command needs to be accessed from a non-cached source, the time required to retrieve this data may create a bottleneck or chokepoint within the accelerated processing pipeline. Thus, when necessary, data is not available in a cache memory, the command may be passed off to a non-priority processing pipeline. However, for commands that pass and satisfy all required checks and/or verifications, can be added to a priority pipeline that can be configured to be processed by the memory array prior to a non-priority queue associated with a non-priority processing pipeline. In this way, response speed is increased, processing overhead can be reduced, and the need for additional CPUs or processors within the storage device can be eliminated or at least reduced.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host computing device 110 with a storage system 102 suitable for automated fast path processing in accordance with an embodiment of the disclosure is shown. The control block management system 100 comprises one or more storage devices 120 of a storage system 102 within a host computing device 110 in communication via a controller 126. The host computing device 110 may include a processor 111, volatile memory 112, and a communication interface 113. The processor 111 may include one or more central processing units, one or more general-purpose processors, one or more application-specific processors, one or more virtual processors (e.g., the host computing device 110 may be a virtual machine operating within a host), one or more processor cores, or the like. The communication interface 113 may include one or more network interfaces configured to communicatively couple the host computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host computing device 110, installed in a port and/or slot of the host computing device 110, installed on a different host computing device 110 and/or a dedicated storage appliance on the network 115, in communication with the host computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host computing device 110 may further comprise computer-readable storage medium 114. The computer-readable storage medium 114 may comprise executable instructions configured to cause the host computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host computing device 110 can include a plurality of virtual machines which may be instantiated or otherwise created based on user-request. As will be understood by those skilled in the art, a host computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like. In certain embodiments, a high-priority bus 124 may be utilized to carry data to the storage device 120. However, in many embodiments, the high-priority bus 124 may be internalized within the storage device 120 only.

The communication interface 113 may comprise one or more network interfaces configured to communicatively couple the host computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
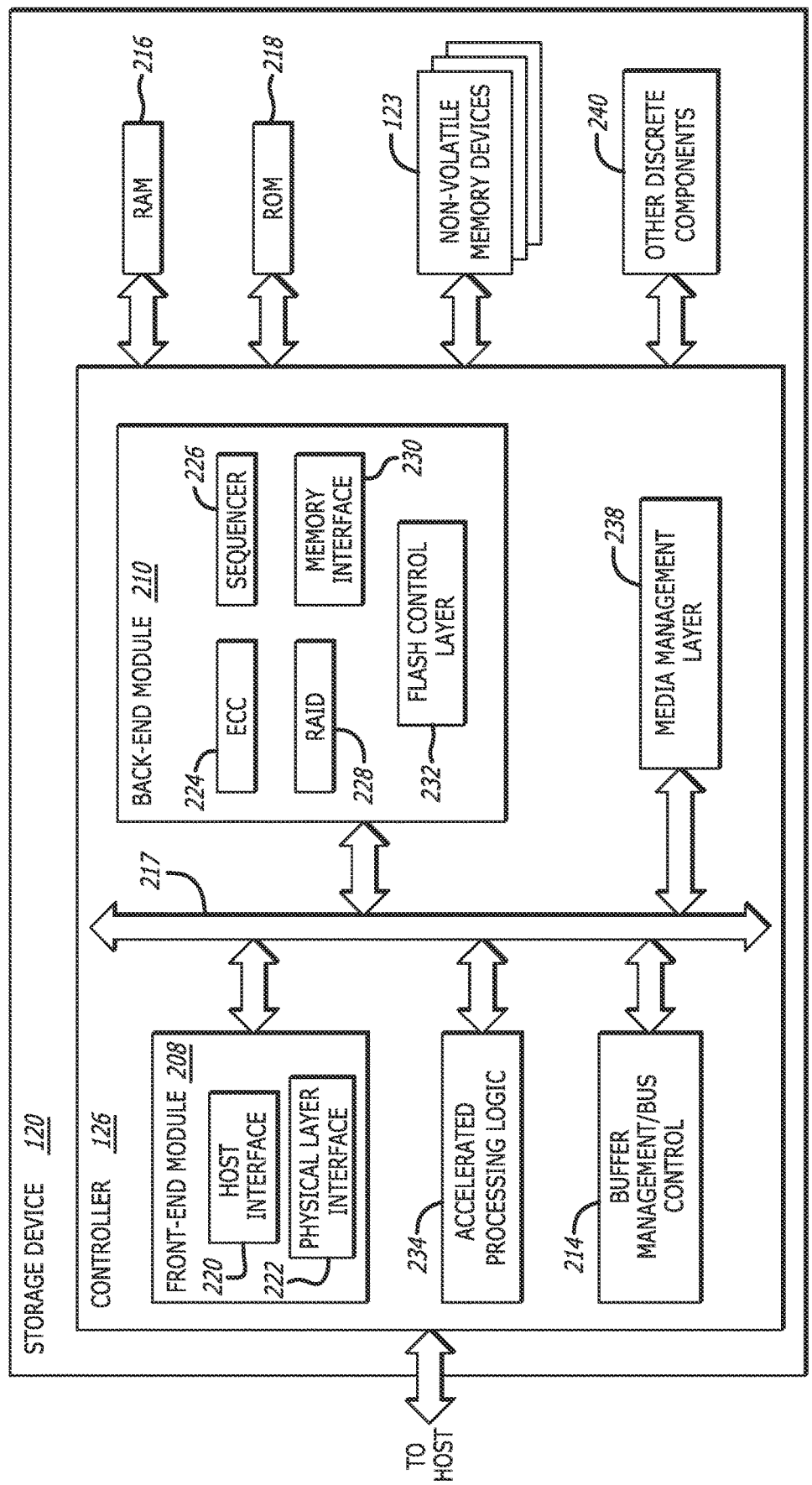
FIG. 2 is a schematic block diagram of a storage device suitable for automated fast path processing in accordance with an embodiment of the disclosure.

Referring to FIG. 2, a schematic block diagram of a storage device 120 suitable for automated fast path processing in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Example types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory devices of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise an accelerated processing logic 234. In many embodiments the accelerated processing logic 234 can be configured to facilitate the execution of the fast path accelerated processing pipelines. As discussed in more detail below in FIGS. 5 and 6, the storage device 120 may include a variety of logics, devices, and/or circuits that accept, parse, or otherwise process commands received from the host computing device. The accelerated processing logic 234 can perform these operations in a number of embodiments and utilize existing components within the storage device 120. In this way, configured a storage device 120 with an accelerated processing pipeline may be achieved via a field update and without the need for specialized components.

However, in certain embodiments, the accelerated processing logic 234 may simply direct specialized components that are disposed within the storage device 120 at the time of manufacture to process various commands received by the host computing device within one or more accelerated processing pipelines. For example, the accelerated processing logic 234 may be configured to read and parse each incoming command from the host computing device and determine which commands are conducive to a fast path accelerated processing pipeline. Additionally, various characteristics about the command may need to be determined, such as which blocks within the memory array are associated with the command, where those blocks are located within the memory array (such as which die they are on), whether data associated with the read command is cached somewhere within the storage device and whether the blocks necessary to complete the command are available for use.

In additional embodiments, the accelerated processing logic 234 can be utilized to arbitrate a priority queue with a non-priority queue within the storage device. As will be described in more detail below, the memory array can be configured with a plurality of queues that can comprise various commands that are configured to access and/or write data to the memory devices within the array. However, one or more queues associated with an accelerated processing pipeline can be configured to have priority over a non-priority or other queue associated with a non-priority processing pipeline. In this way, the accelerated processing logic 234 can utilize one or more arbitration methods to determine which queue should be processed by the memory array next. Still, it is contemplated that other embodiments may utilize an internal processing/arbitration method utilized by the memory array itself.

Figure 3:
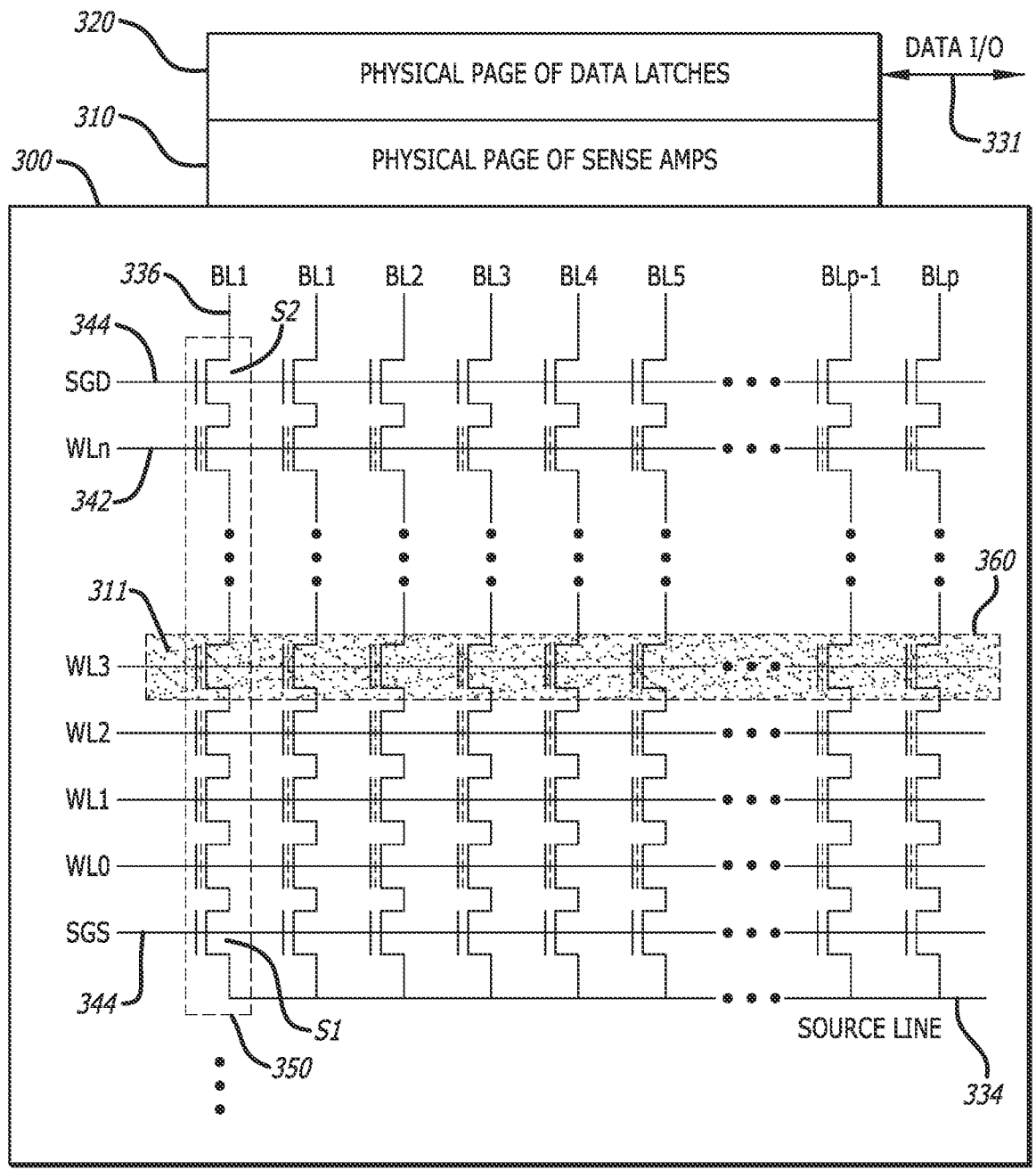
FIG. 3 is a conceptual illustration of a page of memory devices within a memory array in accordance with an embodiment of the disclosure.

Referring to FIG. 3, a conceptual illustration of a page 360 of memory devices within a memory array in accordance with an embodiment of the disclosure is shown. FIG. 3 conceptually shows a bank of NAND strings 350 within a memory array, such as the non-volatile memory array 129 of FIG. 1 which can, in many embodiments, be configured together into one or more blocks 300, superblocks, etc. as needed. A "page" such as the page 360, is a group of memory devices enabled to be sensed or programmed in parallel. This is accomplished in the peripheral circuits by a corresponding page of sense amplifiers 310. The sensed results are utilized in latches within a corresponding set of data latches 320. Each sense amplifier can be coupled to a NAND string, such as NAND string 350 via a bit line 336. For example, the page 360 is along a row and is sensed by a sensing voltage applied to the control gates of the cells of the page connected in common to the word line WL3. Along each column, each memory device such as memory device 311 is accessible by a sense amplifier via a bit line 336. Data in the data latches 320 are toggled in from or out to the controller 126 via a data I/O bus 331.

The NAND string 350 can be a series of memory devices, such as memory device 311, daisy-chained by their sources and drains to form a source terminal and a drain terminal respective at its two ends. A pair of select transistors S1, S2 can control the memory device chain's connection to the external source via the NAND string's source terminal and drain terminal, respectively. In a memory array, when the source select transistor S1 is turned on, the source terminal is coupled to a source line 334. Similarly, when the drain select transistor S2 is turned on, the drain terminal of the NAND string is coupled to a bit line 336 of the memory array. Each memory device 311 in the chain acts to store a charge. It has a charge storage element to store a given amount of charge so as to represent an intended memory state. In many embodiments, a control gate within each memory device can allow for control over read and write operations. Often, the control gates of corresponding memory devices of each row within a plurality of NAND strings are all connected to the same word line (such as WL0. WL1 ... WLn 342). Similarly, a control gate of each of the select transistors S1, S2 (accessed via select lines 344 SGS and SGD respectively) provides control access to the NAND string via its source terminal and drain terminal respectively.

While the example memory devices referred to above comprises physical page memory devices that store single bits of data, in most embodiments each cell is storing multi-bit data, and each physical page can have multiple data pages. Additionally, in further embodiments, physical pages may store one or more logical sectors of data. Typically, the host computing device, such as the host computing device 110 of FIG. 1, operating with a disk operating system manages the storage of a file by organizing the content of the file in units of logical sectors, which is typically in one or more units of 512 bytes. In some embodiments, a physical page may have 16 kB of memory devices being sensed in parallel by corresponding 16 kB of sense amplifiers via 16 kB of bit lines. An example logical sector assigned by the host has a size of 2 kB of data. Thus, a physical page can store 8 sectors if the cells are each configured to store 1 bit of data (SLC). For MLC, TLC, and QLC and other increased density structures, each cell can store 2, 3, 4 or more bits of data, and each physical page can store 16, 32, 64 or more logical sectors depending on the structure utilized.

One unique difference between flash memory and other types of memory is that a memory device must be programmed from an erased state which is associated with no charge within the memory device. This requires that the floating gate must first be emptied of charge prior to programming. Programming adds a desired amount of charge back to the floating gate. It does not support removing a portion of the charge from the floating to go from a more programmed state to a lesser one. Thus, new data cannot overwrite existing data and must be written to a previously unwritten or erased location. Furthermore, erasing all the charges from a floating gate can often take an appreciable amount of time. For that reason, it will be cumbersome and inefficient to erase cell by cell or even page by page. Therefore, in most embodiments, the array of memory devices is often divided into a large number of blocks. As is common in many flash-based memory systems, the block is the unit of erase. That is, each block contains the minimum number of memory devices that are erased in one action. This combined with the limited lifespans of memory devices within the flash memory increases the desire to limit the amount of erasing and programming occurring within the storage device.

To avoid unnecessary erasing, processes to extend useful lifespans of storage devices are often utilized such as, but not limited to, wear leveling. Wear leveling attempts to write data evenly to many memory devices in order to avoid concentrated groups of memory devices from being overused before others. Thus, data passed to the storage device may not be written to the memory arrays in the same order, structure, or manner that it was originally provided in. As a result, storage devices often have to create address translation tables that can account for where a host computing device tracks the location of the memory to where that memory is actually stored within the memory array. In a number of embodiments, the storage device must look up and translate the requested location of data to a real location of the data for each read command provided by the host computing device. For certain read commands, such as random read commands, this translation and other processing can require increased processing power and time to complete the translations. Therefore, in various embodiments described below, an automated fast path can be utilized to accelerate and/or prioritize commands for processing by the memory array, bypassing the need for additional CPUs or processors.

Figure 4:
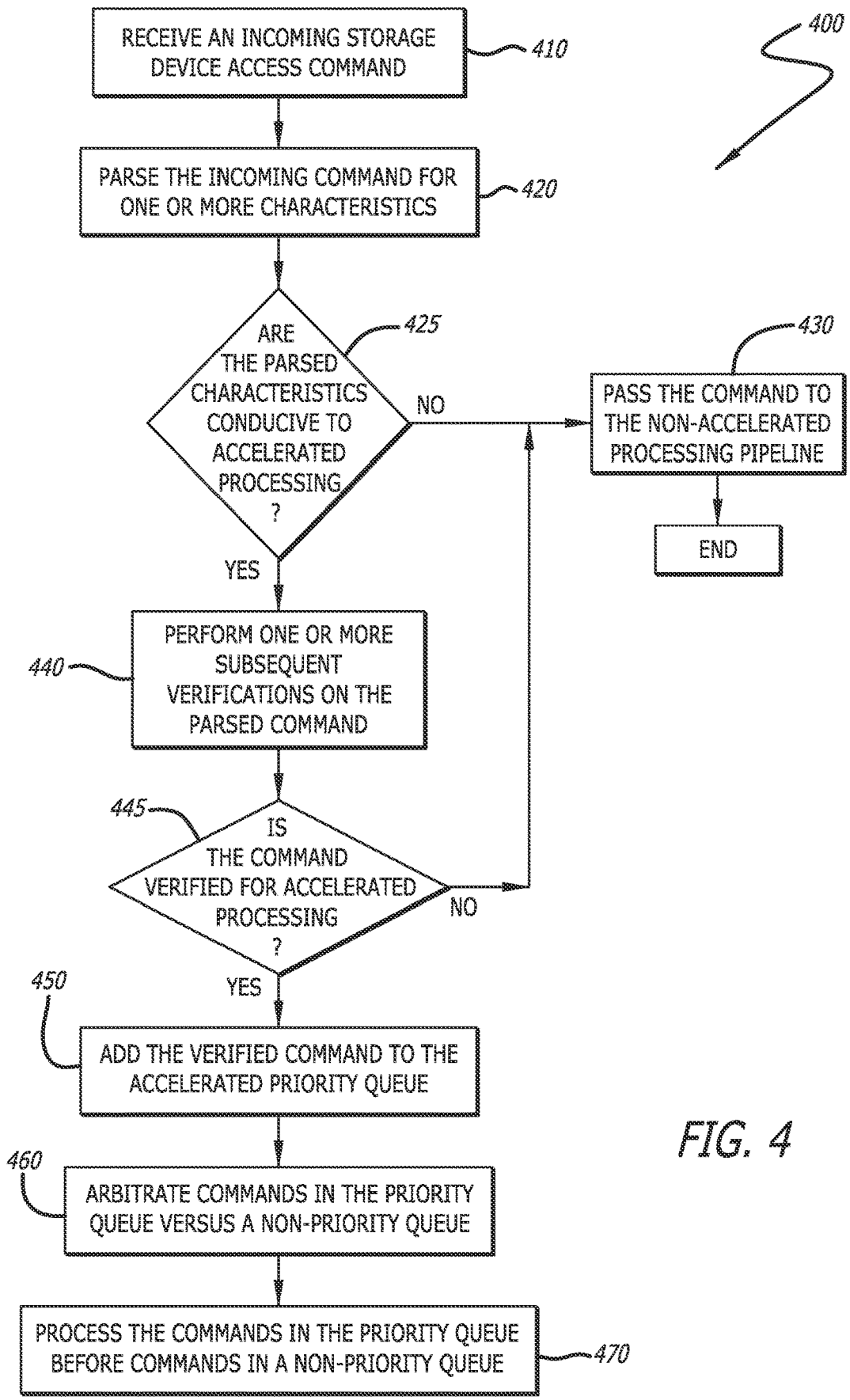
FIG. 4 is a flowchart depicting an automated fast path process in accordance with an embodiment of the disclosure.

Referring to FIG. 4, a flowchart depicting an automated fast path process 400 in accordance with an embodiment of the disclosure is shown. In many embodiments, the process 400 can receive an incoming storage device access command (block 410). Often, the commands involve read and/or write commands to the memory array. In additional embodiments, the process 400 can parse one or more characteristics of the incoming command (block 420). These characteristics may include, but are not limited to, if the command is a read or write command, if the command is part of a random or sequential access or write command, the logical location of the data, etc.

The process 400 can determine if the parsed characteristics are conducive to accelerated processing (block 425). For example, the fast path may be configured to accelerate the processing of certain types of commands such as, but not limited to, random read commands. These types of commands are often processor intensive as multiple translations and other processes are typically completed prior to reading the actual data from the memory array. If the parsed command is not conducive for accelerated processing, it may be passed to a non-accelerated processing pipeline to be completed (block 430).

However, if the parsed command is conducive to accelerated processing, the process 400 may, in certain embodiments, perform one or more subsequent verifications on the parsed command (block 440). The process 400 can utilize those verifications to determine if the command is verified for accelerated processing (block 445). As will be described in more detail below, various embodiments may check if data associated with the command is readily accessible in at least one cache memory, or that the command will only need to access physical memory devices within the same hardware-level die. If gathering data associated with the command will take too long, or if accessing the physical data within the memory array may be deemed to take too long, accelerated processing may not be possible without creating a bottleneck or other choke point in the fast path accelerated processing pipeline.

Thus, if the parsed command is not verified, the process 400 can pass the command to a non-accelerated processing queue (block 430). However, if the parsed command is verified to qualify for accelerated processing, it can be added to one or more accelerated priority queues (block 450). As will be discussed in more detail below, fast path processing may include in some embodiments, a plurality of priority queues that are associated with individual dies, such that commands in those queues require access to data all on a certain die, plane, or other memory construct corresponding to that queue. In further embodiments, the process 400 can arbitrate commands in the one or more priority queues against one or more non-priority queues (block 460). In additional embodiments, the process 400 can arbitrate a priority queue against other priority queues as well as non-priority queues. The arbitration methods used can be customary prioritization methods but may vary based on the application desired. In most embodiments, the process 400 will process commands in the priority queue before commands in a non-priority queue (block 470). A schematic block diagram of this process 400 is discussed below to illustrate various embodiments.

Figure 5:
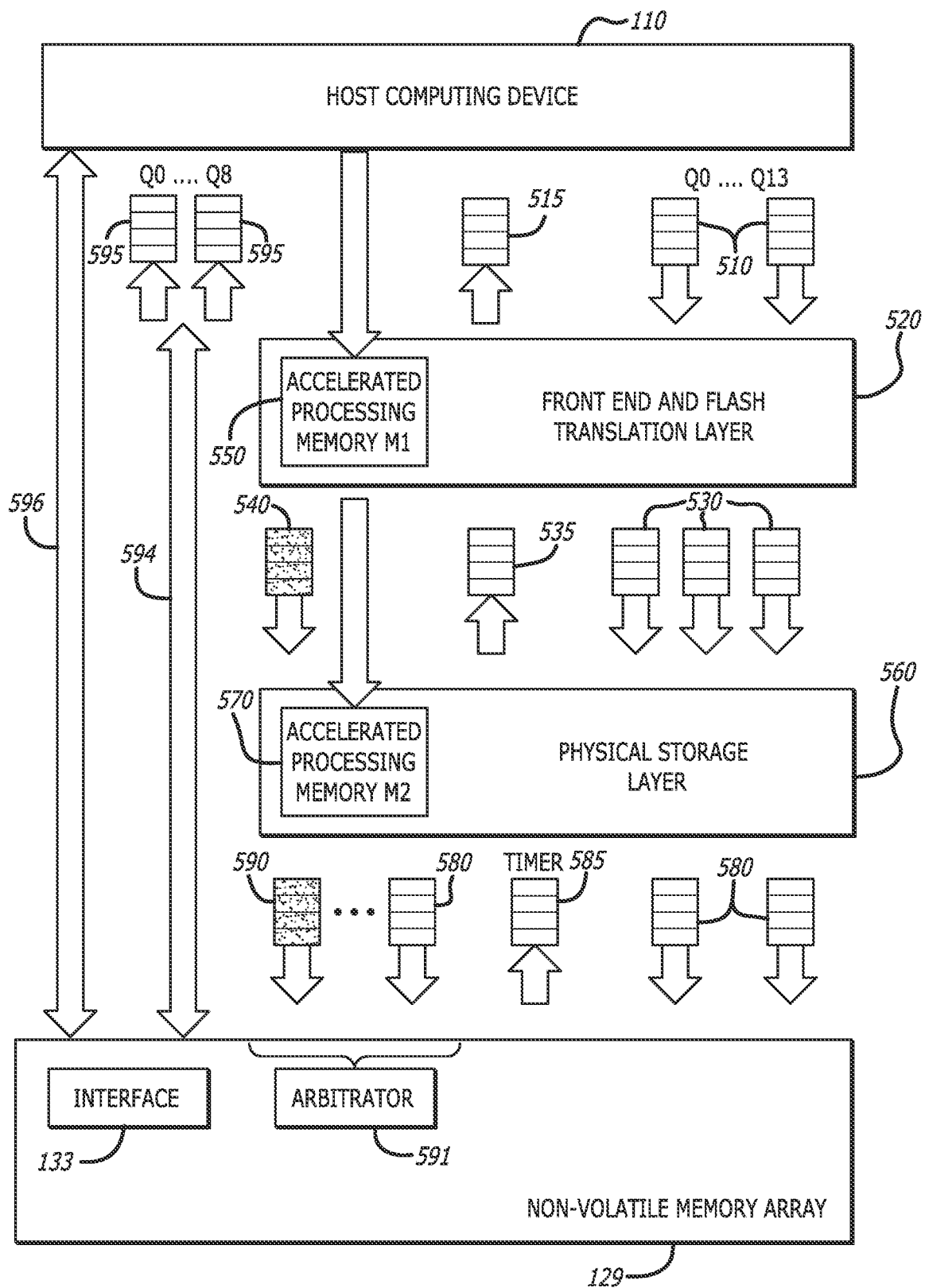
FIG. 5 is a schematic block diagram of automated fast path processing between a host computing device and a storage device memory array in accordance with an embodiment of the disclosure.

Referring to FIG. 5, a schematic block diagram of automated fast path processing between a host computing device 110 and a non-volatile memory array 129 in accordance with an embodiment of the disclosure is shown. Although the diagram depicted in FIG. 5 includes a host computing device 110 communicating directly with a non-volatile memory array 129 and a front end and flash transition layer 520, this is done for illustrative purposes only as many embodiments will include a storage device that communicates with the host computing device 110.

In various embodiments, a host computing device 110 can communicate with a non-volatile memory array 129 through the use of one or more processing pipelines. In order to process these pipelines, various layers of processing are often needed. In the embodiment depicted in FIG. 5, there is a front end and translation layer 520 and a physical storage layer 560 that typically processes data associated with commands prior to being put into a queue directed to the non-volatile memory array 129.

In many embodiments, a plurality of queues are utilized to store and pass data between these different layers and systems. For example, the host computing device 110 can utilize a plurality of queues 510 (labeled Q0 to Q13) to pass data to the front end and flash translation layer 520 as well as receive data back though a return queue 515. However, in various embodiments, the front end and flash translation may include an accelerated processing memory M1 550 which can be configured to store and/or process data that is assigned to the accelerated processing pipeline.

From the front end and flash translation layer 520, data in the non-accelerate processing pipeline can be passed to a number of translation layer queues 530 for delivery to the physical storage layer 560. Data can be returned from the physical storage layer 560 to the front end and flash translation layer 520 via a message return queue 535. In additional embodiments, a portion of memory within the physical storage layer 560 can be configured as an accelerated processing memory M2 570.

Unlike the non-accelerated processing pipeline, the accelerated processing pipeline can establish in various embodiments, a direct channel between the accelerated processing memory M1 550 and the accelerated processing memory M2 570. In these embodiments, the data processed within the accelerated processing memory M1 does not require being put in a queue and can be passed directly to avoid wait times associated with data sitting in a queue waiting for the next cycle to be processed.

However, in certain embodiments, there may be a discrepancy in the timing of processing between the accelerated processing memory M1 550 and the next accelerated processing memory M2 570. In these embodiments, it may be necessary to temporarily store data within the accelerated processing pipeline. In these embodiments, an intermediate priority queue 540 can be utilized. In additional embodiments, this intermediate priority queue 540 may also be selected for processing within the physical storage layer 560 prior to other non-priority translation layer queues 530.

In further embodiments, the physical storage layer 560 can pass data ready for processing by the non-volatile memory array 129 into a plurality of non-priority queues 580. Messages from the non-volatile memory array 129, such as timings or completion messages, can be communicated to the physical storage layer 560 through the use of one or more queues such as, but not limited to, a timer queue 585. The plurality of non-priority queues may be configured to operate on a first-in, first-out (FIFO) system. However, these non-priority queues 580 may also build up stored commands depending on the current operating situation within the storage device or non-volatile memory array 129.

In many embodiments, when a command processed through the accelerated processing pipeline is ready to be passed from the accelerated processing memory M2 570 to the non-volatile memory array 129, it may be placed in a priority queue 590. In additional embodiments, a plurality of priority queues 590 may be configured to correspond to a particular memory structure within the non-volatile memory array 129. For example, a priority queue 590 may be configured to correspond to a single hardware die, plane, or other memory construct within the memory array 129.

When presented with at least one command in a priority queue 590, the non-volatile memory array 129 may utilize an arbitrator 591 which can select which queue should be processed next. In a number of embodiments, the arbitrator 591 may be operated by a specialized logic or other circuit and may not necessarily be located within the memory array. In more embodiments, the arbitrator 591 will utilize one or more arbitration methods to process a plurality of priority and non-priority queues. However, in most embodiments, the arbitrator 591 will process a command in a priority queue 590 prior to a command residing within a non-priority queue 580.

Once the command is processed, the interface 133 can communicate the requested data and/or completion message back to the host computing device 110. In this way, the data may be sent via a priority processing return pipeline 596 for direct delivery or may be processed through a non-priority processing return pipeline 594. The non-priority processing return pipeline 594 may deposit data into one or more responsive return queues 595.

It is contemplated that other configurations of the embodiment depicted in FIG. 5 may be utilized depending on the application desired. For example, the flow of data to and from the non-volatile memory array 129 may not occur exactly as described herein and may have additional or fewer intermediate steps. Additionally, the priority processing return pipeline 596 may also have a response priority queue that can hold data that is waiting to be accepted and/or processed by the host computing device 110. Finally, it should again be indicated that the embodiment depicted in FIG. 5 is for illustrative purposes and the host-computing device may communicate with a storage device directly, leaving other operations highlighted in this discussion internal to that storage device, operating without visibility to the host computing device 110.

Figure 6:
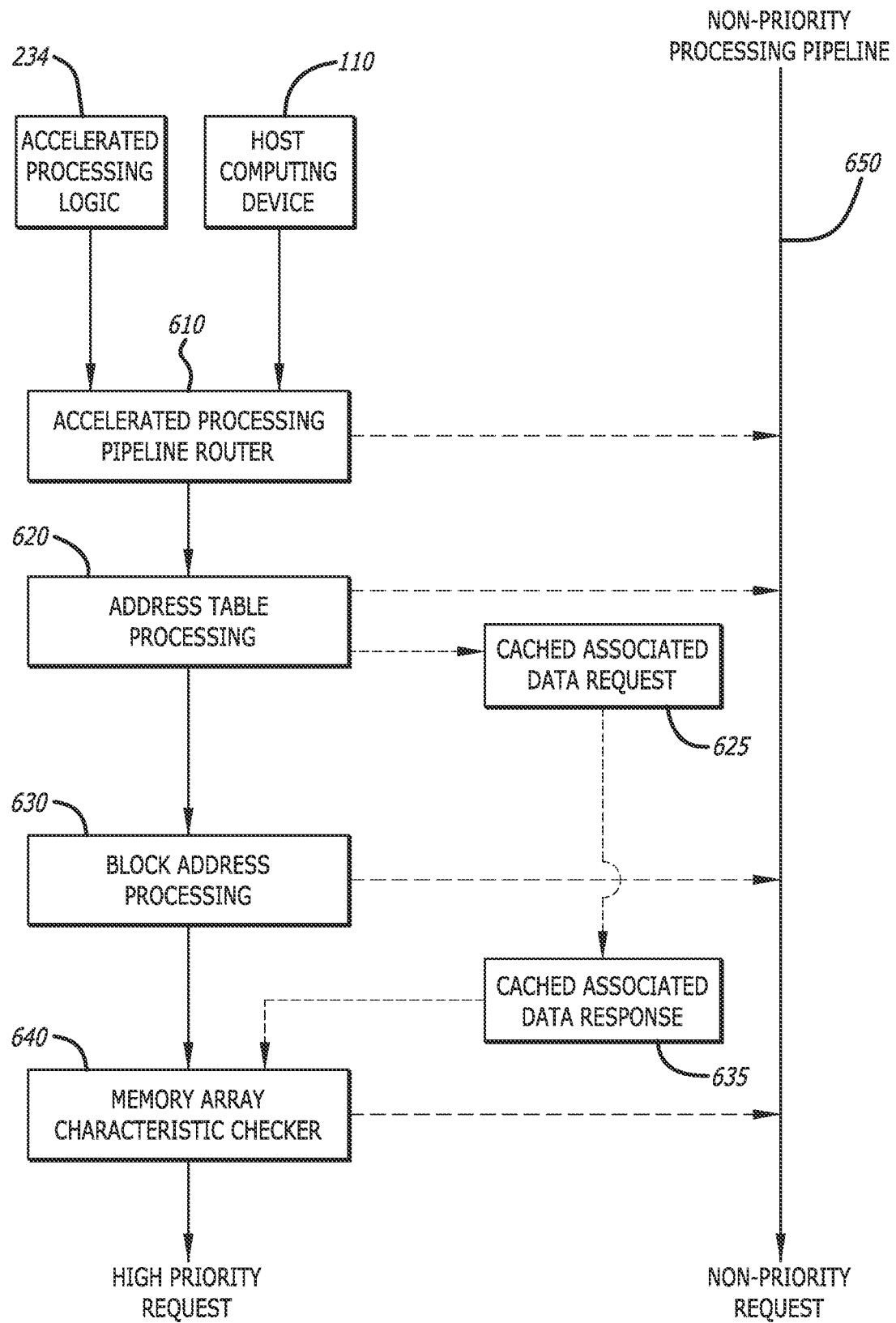
FIG. 6 is a schematic block diagram depicting a process for selecting and verifying commands within an automated fast path process in accordance with an embodiment of the disclosure.

Referring to FIG. 6, a schematic block diagram depicting a process for selecting and verifying commands within an automated fast path process in accordance with an embodiment of the disclosure is shown. In many embodiments, a traditional non-priority (i.e., non-accelerated) processing pipeline 650 receives commands form a host computing device 110 and processes them until they are suitable for accessing or writing data to a memory array within a storage device.

In a number of embodiments however, an accelerated processing logic 234 can operate an accelerated processing pipeline router 610 that can parse or receive copies of all commands received from a host computing device 110. The accelerated processing pipeline router 610 can determine if a received command is conducive to processing within an accelerated processing pipeline. When the command is determined to not be conducive, it can be passed to the non-priority processing pipeline 650 for processing. Alternatively, if the command is determined to be conducive to accelerated processing, the router may mark or otherwise flag the data for accelerated processing. In certain embodiments, the accelerated processing pipeline router 610 may update a register or other data using an interface process.

Once passed into the accelerated processing pipeline, the command can be passed to an address table processing module 620. In various embodiments, this module can be utilized to determine an address conversion or other physical to logical processes. If there are problems or requirements that are not met when processing the command, the address table processing module 620 may pass the command to the non-priority processing pipeline 650 for subsequent completion. In further embodiments, the accelerated processing pipeline will require that a cached copy of data associated with the command, such as but not limited to, an address table be available in one or more cache memories. Thus, the address table processing module 620 may send a request for cached associated data 625 to the relevant systems and/or areas.

In certain embodiments, the time to receive a response to the request for cached associated data 625 may create a bottleneck or chokepoint within the accelerated processing pipeline. As such, further processing may be done until the response is received. In the embodiment depicted in FIG. 6, the accelerated processing pipeline can continue to operate a block address processing module 630 to examine where within the memory array the command may be required to access. In certain embodiments, the locations of where data can be accessed can limit if a command can be processed through the accelerated processing pipeline. For example, if data is required to be read over different areas, the time required to access this data may create a bottleneck or choke point within the accelerated processing pipeline. In these cases, the block address processing module 630 can pass the command to the non-priority processing pipeline 650 for further processing.

However, if the data required to complete the command satisfies a predetermined limit of disparity, then the command can be passed to the memory array characteristic checker module 640. In various embodiments, the memory array is required to be in a particular condition prior to completing the accelerated processing pipeline command. For example, the areas needed for accessing the data may already be in use by a previous priority or non-priority command. In other examples, the blocks required for access may just not be available within the timeframe needed to be considered qualifying for the accelerated processing pipeline.

Additionally, in the embodiment depicted in FIG. 6, the cached associated data response 635 is received and passed to the memory array characteristic checker module 640. With this information, it can be determined if the response is indeed suitable to be passed into a priority queue for processing by the memory array via an accelerated processing pipeline. However, when the cached response is unsatisfactory and/or the memory array characteristics don't indicate suitability for accelerated processing, the memory array characteristic checker module 640 can pass the command to the non-priority processing pipeline 650 to complete.

Figure 7:
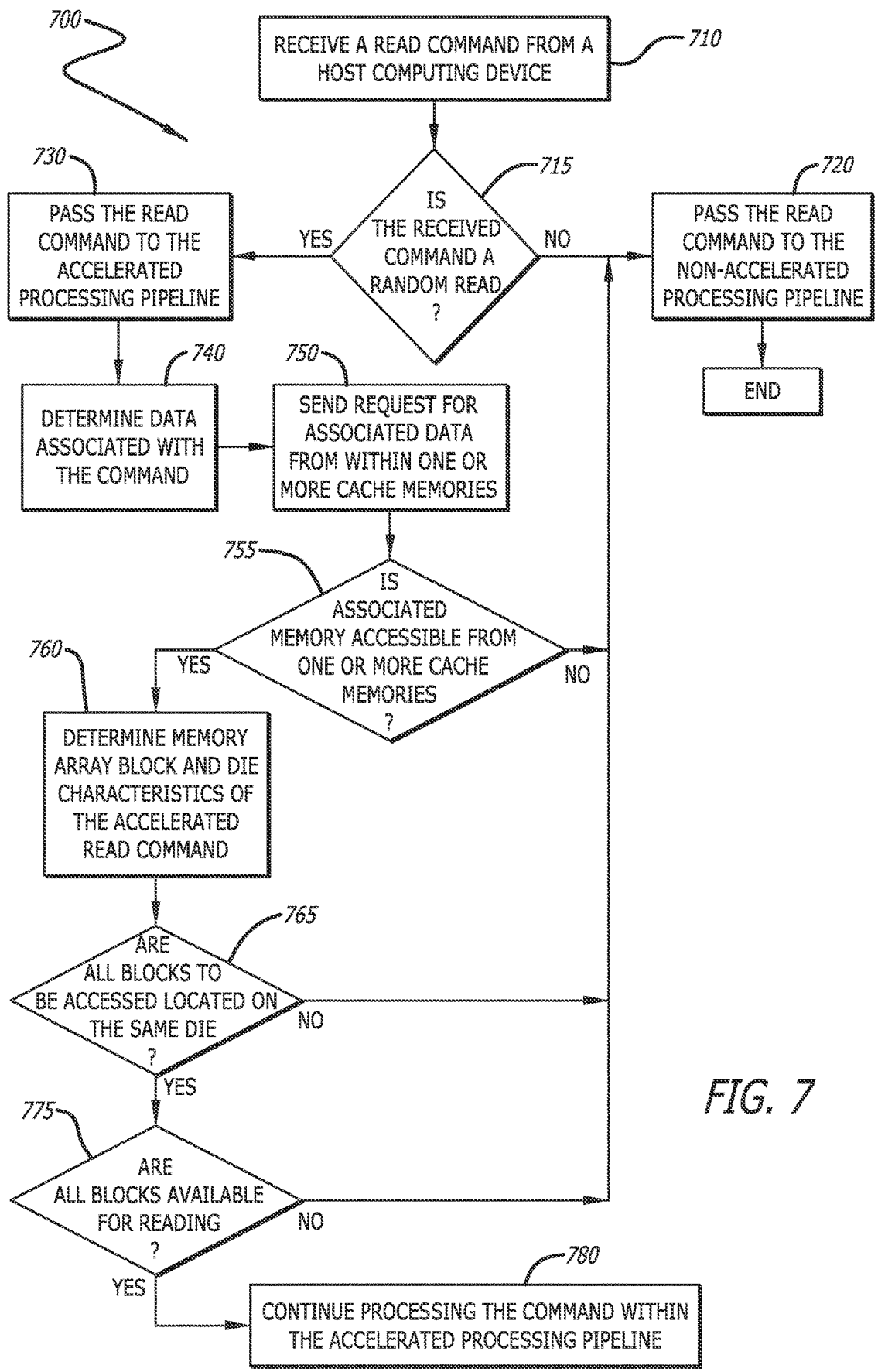
FIG. 7 is a flowchart depicting a process for selecting and verifying commands within an automated fast path process in accordance with an embodiment of the disclosure.

Referring to FIG. 7, a flowchart depicting a process 700 for selecting and verifying commands within an automated fast path process in accordance with an embodiment of the disclosure is shown. As discussed previously, not all received commands may be eligible to be processed within a fast path accelerated processing pipeline. Various parsing and verifications may require to be successfully completed before a command is placed within a priority queue of the memory array.

In many embodiments, the process 700 can receive a read command from a host computing device (block 710). As discussed above, these commands can be sequential or random in nature. The process 700 can determine if the received command is a random read (block 715). If the received command is not a random read, the process 700 can pass the read command to a non-accelerated processing pipeline to complete processing (block 720). However, in many embodiments, when the received command is a random read command, the process 700 can pass the read command to the accelerated pipeline (block 730).

Once in the accelerated pipeline, the process 700 in a number of embodiments, may determine data associated with the command (block 740). As stated previously, logical addresses provided by the host computing device may need translated to determine a physical address. These address tables, once determined, may be stored in cache in the event they are needed for subsequent access. Thus, in certain embodiments, for example, the process 700 may send a request for associated data from within one or more cache memories (block 750).

The process 700 can determine if the associated data is accessible from one or more cache memories (block 755). If no associated data is found in a cache memory location, then the process 700 can pass the command over to a non-accelerated processing pipeline (block 720). However, if a minimum amount of associated data is located within one or more cache memories, then the process 700 can further determine the memory array block, plane and/or die characteristics of the accelerated read command (block 760).

It should be noted that in various embodiments, the request for associated data may take a relatively long time which may require additional intermediate steps to occur in order to avoid a bottleneck or other chock point in the fast path accelerated processing pipeline. This delay is shown in the embodiment depicted in FIG. 6. Therefore, it is contemplated that other various steps, processes, or other operations may occur in a different order based on the time required to access associated data within one or more cache memories.

In additional embodiments, the process 700 can access the determined characteristics to verify if all of the blocks to be accessed related to the accelerated command are located within the same die, plane, or other memory construct (block 765). If the accelerated read command requires accessing blocks located on multiple dies within the memory array, the process 700 can pass the read command to a non-accelerated processing pipeline (block 720). However, it is contemplated that this hardware-based restriction may not be necessary in certain embodiments depending on the structure of the memory devices within the memory array. In other words, various embodiments may not require all blocks to be located on the same die. In fact, certain embodiments may have a different structure to their memory devices and may not penalize accelerated processing if blocks or other structures are to be accessed across multiple structural locations.

However, in the embodiment of process 700, if all blocks are to be accessed on the same die, a subsequent determination can be performed to verify that all required blocks are going to be available for reading (block 775). Again, when the necessary blocks are not available for reading, the process 700 can pass the read command to a non-accelerated processing pipeline (block 720). Conversely, when all blocks are available for reading in the timeframe required by the accelerated read command and associated fast path accelerated processing pipeline, the process 700 can continue processing the command within that accelerated processing pipeline (block 780). As previously described above, further processing can include, but is not limited to, adding the read command to one or more priority queues for arbitration against a non-priority queue. The arbitration process is discussed in more detail below.

Figure 8:
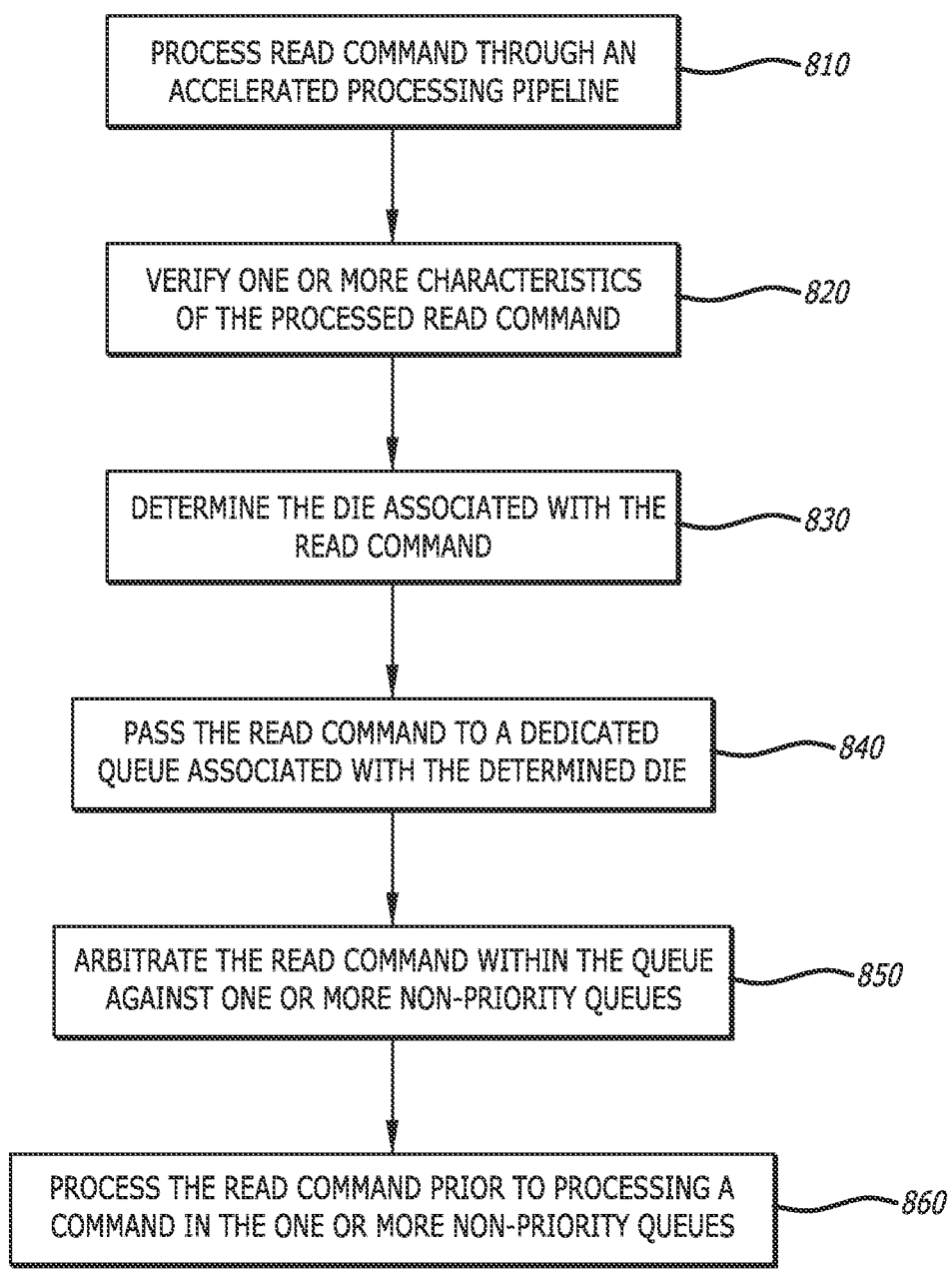
FIG. 8 is a flowchart depicting a process for arbitrating priority commands within a storage device in accordance with an embodiment of the disclosure.

Referring to FIG. 8, a flowchart depicting a process 800 for arbitrating priority commands within a storage device in accordance with an embodiment of the disclosure is shown. In many embodiments, the process 800 can take and process a read command through an accelerated processing pipeline (block 810). Processing read commands through an accelerated processing pipeline has been described previously and may be similar to those embodiments described above. In a number of embodiments, during the processing of the read command, one or more characteristics may be verified (block 820). As described above, characteristics may include the availability, location, and/or status of the memory to be read by the command, however, other characteristics may be verified.

In the embodiment depicted in FIG. 8, the process 800 can determine the die, plane, or other memory construct associated with the read command (block 830). As described above, the memory array can be comprised a plurality of memory arrays to be configured into one or more dies within the array. If the read command is associated with the reading of memory devices all located on the same die, the process 800 can pass the read command to a dedicated queue associated with the determined die, plane, or other memory construct (block 840). Each die, plane, or other memory construct within the memory array can have a dedicated queue associated with it, although it is contemplated that some embodiments may have a single priority queue that has some metadata or other indication or data that can guide direction to the proper die, plane, or other memory construct associated with the read command.

Once a priority queue has received one or more commands, the process 800 can arbitrate the read command within the priority queue against one or more non-priority queues (block 850). As described above with respect to FIG. 5, multiple priority and non-priority queues may exist to communicate with the memory array. Traditional methods typically utilized a first-in, first-out (FIFO) system of processing queued items. However, an arbitration method may be utilized once there a read command is detected with a priority queue. The process 800 may utilize any of a number of available arbitration methods to determine which read command should be processed by the memory array next. However, it is typically expected that in most embodiments priority queue items will be processed before one or more non-priority queue items (block 860). However, based on the application desired, it is contemplated that certain non-priority queue items may be processed, especially after a predetermined period of time has elapsed between non-priority queue item processing.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
a processor; a memory array comprising a plurality of memory devices; and
an accelerated processing logic configured to:
receive incoming commands;
parse the received incoming commands;
pass one or more parsed commands to a parallel accelerated processing pipeline, wherein the parallel accelerated processing pipeline comprising a first accelerated processing memory in a front-end and flash translation layer and a second accelerated processing memory in a physical storage layer;
perform, within the parallel accelerated processing pipeline, one or more verifications on the parsed command, to determine its eligibility for prioritized die-specific processing, wherein the one or more verifications comprise at least determining if data associated with the parsed command is accessible from one or more cache memories;
determine a die associated with the parsed command;
add, upon passing the one or more verifications, the parsed command into a priority queue among the one or more priority queues wherein the priority queue is associated with the determined die,
arbitrate the parsed command against one or more non-priority queues; and process the parsed command in the priority queue before commands within a non-priority queue.

2. The device of claim 1, wherein the incoming commands are received from a host computing device.

3. The device of claim 2, wherein incoming commands are read commands configured to retrieve data stored within the memory array of the device.

4. The device of claim 3, wherein the accelerated processing logic if further configured to parse the received incoming commands to determine if the received incoming commands are suitable for accelerated processing.

5. The device of claim 4, wherein the suitability of the parsed command is determined by a type of command received.

6. The device of claim 5, wherein the type of command received is a read command with a size below a predetermined threshold.

7. The device of claim 6, wherein the predetermined threshold is sixteen kilobytes.

8. The device of claim 5, wherein the plurality of memory devices are located within one or more dies.

9. The device of claim 6, wherein the read command is associated with memory devices located on the same die within the memory array.

10. The device of claim 1, wherein the accelerated processing logic is further configured to determine the number of commands currently in the parallel accelerated processing pipeline prior to passing in additional commands.

11. The device of claim 10, wherein, upon determination that the number of commands in the parallel accelerated processing pipeline is above a predetermined threshold, passing the one or more parsed commands to a non-accelerated processing pipeline.

12. The device of claim 1, wherein, upon failing the one or more verifications, the command is passed to a non-accelerated processing pipeline.

13. The device of claim 12, wherein a verification fails if data associated with the command is not retrievable from a cached memory.

14. A method for accelerated storage device processing, comprising:
receiving incoming commands from a host computing device;
determining if the received commands are suitable for accelerated processing;
passing the suitable commands to a parallel accelerated processing pipeline, wherein the parallel accelerated processing pipeline comprising a first accelerated processing memory in a front-end and flash translation layer and a second accelerated processing memory in a physical storage layer;
performing, within the parallel accelerated processing pipeline, one or more verifications on the parsed command, to determine its eligibility for prioritized die-specific processing, wherein the one or more verifications comprise at least determining if associated data is accessible from one or more cache memories;
determining a die associated with the at least one suitable command;
adding, upon passing the one or more verifications, the at least one suitable command into a priority queue associated with the determine die to read data from a memory array,
wherein commands in the priority queue will be processed before commands within a non-priority queue; and
arbitrating the one or more suitable commands within the priority queue against the non-priority queues.

15. The method of claim 14, wherein suitable commands are configured to be random read commands that are smaller than a predetermined size.

16. The method of claim 14, wherein suitable commands are configured to read data from a plurality of memory devices located within the same die within a memory array of the device.

17. The method of claim 15, wherein the one or more verifications comprise locating data associated with the command within the one or more cache memories.

18. A device comprising:
a processor;
a memory array comprising a plurality of memory devices; and
an accelerated processing logic configured to:
establish a non-accelerated processing pipeline;
receive incoming commands;
parse the received incoming commands;
establish, upon determination that a parsed command is suitable for accelerated processing, a parallel accelerated processing pipeline, wherein the parallel accelerates processing pipeline comprising a first accelerated processing memory in a front-end and flash translation layer and a second accelerated processing memory in a physical storage layer;
pass the suitable command to the parallel accelerated processing pipeline;
perform, within the parallel accelerated processing pipeline, one or more verifications on the parsed command, to determine its eligibility for prioritized die-specific processing, wherein the one or more verifications comprise at least determining if data associated with the suitable command is accessible from one or more cache memories;

determine a die associated with the suitable command;

add, upon passing the one or more verifications, the command into a priority queue associated with the determined die, wherein commands in the priority queue will be processed before commands within a non-priority queue; and arbitrate a read command within the priority queue.

19. The device of claim 18, wherein the priority queue is dynamically generated upon the establishment of the parallel accelerated processing pipeline by changing one or more properties associated with a non-priority queue such that it is subsequently processed as a priority queue.

20. The device of claim 19, wherein, upon the queue of the parallel accelerated processing pipeline becoming empty, any resources utilized to establish the accelerated processing pipeline and priority queues are released to the non-accelerated processing pipeline and non-priority queues.

* * * * *